United States Patent

Ishii et al.

[11] Patent Number: 5,675,435
[45] Date of Patent: Oct. 7, 1997

[54] REAR PROJECTION IMAGE DISPLAY DEVICE

[75] Inventors: Masaki Ishii; Ichiro Matsuzaki; Toru Watanabe, all of Niigata, Japan

[73] Assignee: Kuraray Co., Ltd., Kurashiki, Japan

[21] Appl. No.: 615,953

[22] Filed: Mar. 14, 1996

[30] Foreign Application Priority Data

Mar. 16, 1995 [JP] Japan .................... 7-056381

[51] Int. Cl.⁶ .................................... G03B 21/60
[52] U.S. Cl. ................ 359/460; 359/443; 359/452; 359/457
[58] Field of Search ...................... 359/443, 452, 359/453, 456, 457, 460

[56] References Cited

U.S. PATENT DOCUMENTS 4,206,969  6/1980  Cobb et al. ................... 350/126
5,066,099  11/1991  Yoshida et al. ................ 359/457

Primary Examiner—Daniel P. Malley
Attorney, Agent, or Firm—Oblon, Spivak, McClelland, Maier & Neustadt, P.C.

[57] ABSTRACT

A rear-projection image display device comprising a light source, a display element for visual images, a projection lens and a screen for viewing visual images projected on the screen from the rear, wherein the ratio d/a between the diameter d of the exit pupil of the projection lens and the projection distance a is 0.06 or less, said screen whereon visual images are displayed includes at least two diffusion elements, and light-diffusing fine particles are dispersed in one of the two diffusion elements which is closest to the viewer.

6 Claims, 4 Drawing Sheets

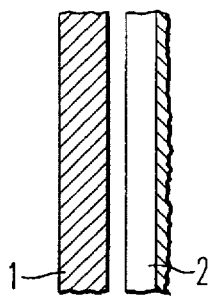 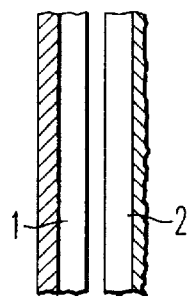 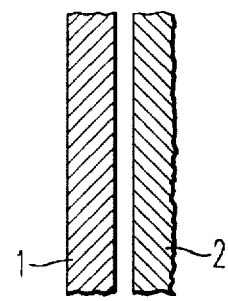 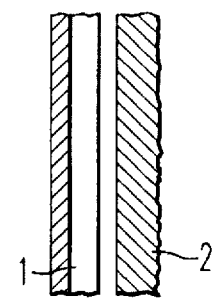
*FIG.1A*   *FIG.1B*   *FIG.1C*   *FIG.1D*
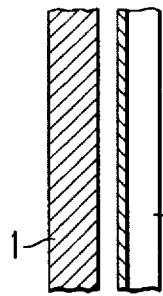 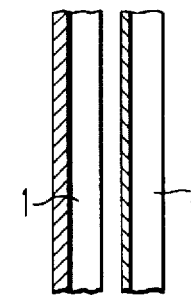 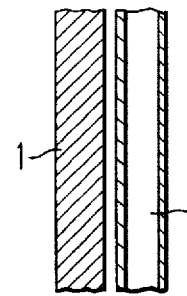 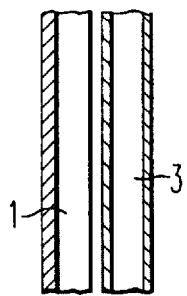
*FIG.1E*   *FIG.1F*   *FIG.1G*   *FIG.1H*   *FIG.1I*
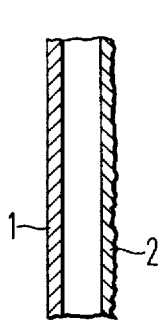 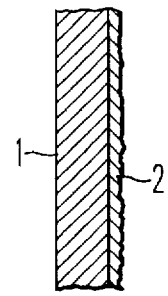 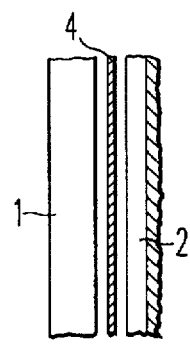 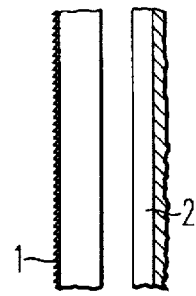
*FIG.1J*   *FIG.1K*   *FIG.1L*   *FIG.1M*
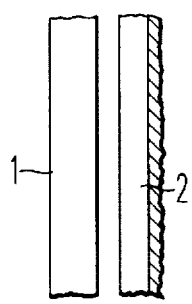
*FIG.2*

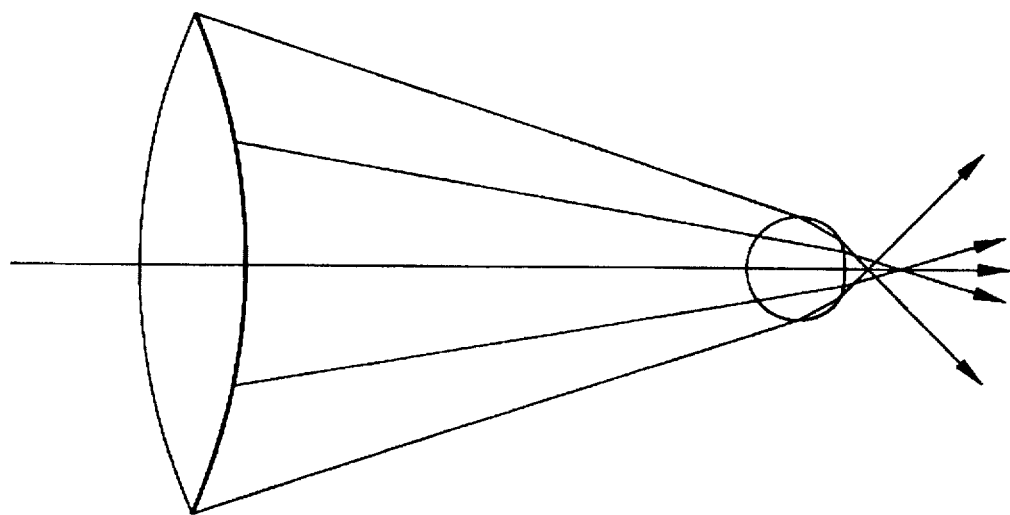
FIG. 3A
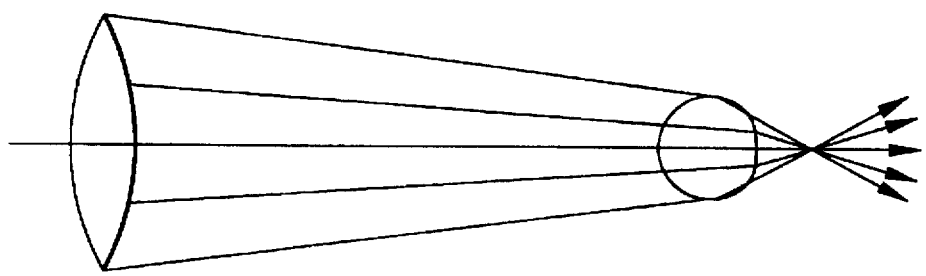
FIG. 3B
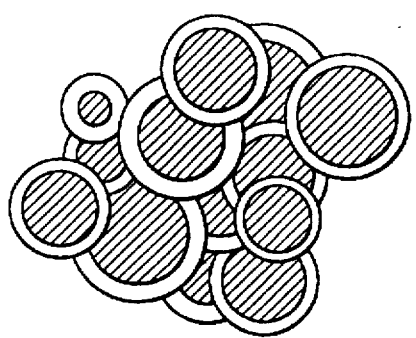          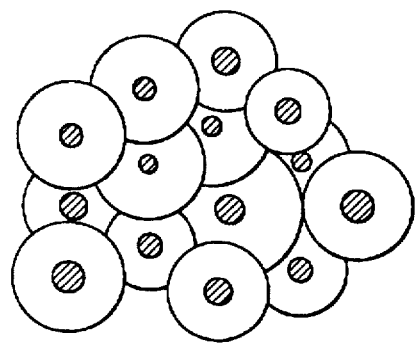
FIG. 4A                FIG. 4B

1

REAR PROJECTION IMAGE DISPLAY DEVICE

BACKGROUND OF THE INVENTION

1. Field of the Invention

The present invention relates to an image display device of rear-projection type which enlarges and displays images projected thereon from the rear.

2. Disclosure of the Prior Art

Generally, CRTs (cathode-ray tubes) are used as the image display element of a rear-projection image display device. Because of their structure, it is difficult to make CRTs compact. Moreover, rear-projection image display devices require three CRTs for red (R), green (G) and blue (B). Use of CRTs therefore possesses a bottleneck in the attempt to make image display devices compact. To cope with this problem, there has been developed in recent years a rear-projection image display device which uses small-size liquid crystal panel or digital micro mirror device ("DMD") about 1 to 3 inches at most in diagonal size as the image display element.

In the rear-projection image display devices, the screen on which visual images are projected usually comprises a Fresnel lens which directs divergent light rays toward the viewer, and a lenticular lens sheet which diffuses the light rays forming images. In the lenticular lens sheet, light rays in the horizontal direction are diffused by the effect of the lens, and those in the vertical direction by the effect of light-diffusing fine particles contained in the diffusion layer of the lenticular lens sheet. The light diffusion properties differ between the horizontal and the vertical directions.

In case a liquid crystal panel or DMD is used as the image display element instead of CRT, it entails the problem of so-called moire pattern which is stripes in graded brightness if the lenticular lens having a pitch substantially equal with that of the lens sheet used in the conventional rear-projection image display device is used. This is due to interference between the pixel structure of the liquid crystal panel and the periodic structure of the lenticular lens sheet. In order to avoid occurrence of moire pattern, the difference in the pitches of respective periodic structures should be made greater. Thus, attempts are being made to decrease the pitch of the lenticular lens sheet. As the pitch of the lenticular lens sheet becomes finer, its thickness generally decreases and thereby decreases the thickness of the diffusion layer wherein the light-diffusing fine particles are dispersed. This has highlighted the problem of fine bright spots on the screen, what is generally known as scintillation. Problems due to scintillation are becoming more serious as the liquid crystal panels and DMDs used in the rear projection image display devices become more compact.

OBJECTS AND SUMMARY OF THE INVENTION

The present invention aims at solving the problems encountered in the prior art and providing a rear-projection image display device which reduces scintillation and produces high-quality images.

To achieve the above mentioned object, the rear-projection image display device according to the present invention comprises a light source, an image display element, a projection lens, and a screen to allow viewing of images projected on the screen from the rear. In the display device, the ratio d/a between the diameter d of the exit pupil of the projection lens and the projection distance a is less than 0.06. The screen on which images are displayed includes a first diffusion element arranged on the side closer to the light source and a second diffusion element arranged nearer to the viewer, said second diffusion element containing the light diffusing fine particles.

As CRTs measuring 5 inches or more in diagonal size are usually used in the CRT type rear-projection image display devices, projection lenses having a larger exit pupil diameter are used. On the other hand, in the rear-projection image display device using a liquid crystal panel or DMD, the panel or DMD is usually smaller than 3 inches in diagonal size in order to make the image display device more compact. For this reason, the exit pupil of the projection lens is normally small in diameter. The present inventors have found that occurrence of scintillation depends on the following factors.

Causes for scintillation will now be explained first from the standpoint of geometrical optics and then of wave optics.

FIG. 3A shows the path of the light incident to the light diffusing fine particles in the diffusion element positioned closest to the viewer when the exit pupil of the projection lens has a larger diameter. As shown in FIG. 3A, the light rays enter a light diffusing fine particle at a somewhat large angle. Here, the light rays emerge from the portion indicated by a bold line in FIG. 3A toward the viewer. FIG. 3B, on the other hand, shows the path of the light when the exit pupil of the projection lens is smaller in diameter (such as when the light source is a point light source). As shown in FIG. 3B, the light rays are emitted toward the viewer only from a very limited area of the light diffusing particles. It should be noted here that projection distance is the same in FIGS. 3A and 3B. FIGS. 4A and 4B are the front views of FIGS. 3A and 3B respectively. As shown in FIG. 4A, substantially entire surface of the light diffusing particles becomes bright if the exit pupil of the projection lens has a large exit pupil diameter. On the other hand, if the said exit pupil diameter is smaller as shown in FIG. 4B, only a very limited area of the particles becomes bright, resulting in sharp contrast of brightness.

The present invention has been contrived on the basis of the above finding. According to the present invention, at least two light diffusion elements are arranged in the direction of optical axis of the light emitted from a light source. With this construction, the light diffused by the diffusion element arranged closest to the incident (light source) side is emitted from the diffusion element at different angles. These light rays emitted in different angles enter the light diffusion element arranged closest to the emergent (viewer) side. Suppose the diffusion elements on the incident and emergent sides are distanced from each other. Since the light rays are emerging from the diffusion element on the incident side at different angles, those coming from various points of the diffusion element on the incident side would be converged on one point on the emergent side if one such particular point is to be noted. This alleviates scintillation occurring at the diffusion element on the emergent side. On the other hand, scintillation occurring at the incident side becomes blurred on its contour because it is observed through the diffusion element on the emergent side. This alleviates the scintillation occurring at the incident side.

Explanation based on wave optics will now be given. Luminous flux with an extremely small d/a ratio, i.e. smaller than 0.06, has extremely high parallelism. In this case, the light source can be deemed as a point lights source, and interference of luminous flux is likely to occur. Thus, when the distance between two points where diffusing lights emerge is small, the diffusing lights emerging from two different points give rise to very fine interference pattern. This phenomenon will be described in detail by referring to FIGS. 5A and 5B.

In FIG. 5A, scattered light rays 7a and 7b emitted from the two points P and Q on the diffusion element 5 on the incident side reach the point A on the diffusion element 6 on the emergent side. Here, the distance between the points P and Q is given as a. Referring to FIG. 5B wherein the distance between the diffusion element 5 on the incident side and the diffusion element 6 on the emergent side is somewhat greater, the scattered light rays 7a' and 7b' from the two points P' and Q' on the diffusion element 5 on the incident side reach the point A of the element 6 on the emergent side. The distance between the points P' and Q' is given as a'. In geometrical optics, as the intensities of the scattered light rays 7a and 7b directed from the points P and Q toward the point A and of the scattered light rays 7a' and 7b' directed from the points P' and Q' toward the point A are all equal, no difference is observed in the phenomena taking place in the cases shown in FIGS. 5A and 5B. In wave optics, however, there occurs fine interference pattern in the case of FIG. 5A while no such pattern occurs in the case of FIG. 5B, given a<L<a', if numerical value L is assigned as the coherence length. This value is variable depending on the value of d/a and the spectrum of the wavelength of the light emitted from the light source. The required distance between the diffusion element 5 on the incident side and the diffusion element 6 on the emergent side also varies depending on the light diffusing properties of the diffusion element on the incident side.

According to a preferred embodiment of the present invention, the distance between the incident plane on the diffusion element which is closest to the projection lens and the light emergent plane on the diffusion element closest to the viewer is 1.5 mm or more. If the diffusion property of the diffusion element on the incident side is set at a greater value, the distance between the light incident plane on the diffusion element which is closest to the projection lens and the light emergent plane on the diffusion element which is closest to the viewer may be small, but this is not preferable as the images itself become blurred.

In order to achieve the above mentioned object, the present invention rear-projection image display device comprising a light source, an image display element, a projection lens and a screen is such that the ratio d/a between the diameter d of the exit pupil of the projection lens and the projection distance a is 0.06 or less. Light-diffusing fine particles are contained in the screen on which visual images are displayed. The light-diffusing fine particles are made non-spherical in form in order for the emergent light rays emitted from plural points of said light-diffusing particles to come in the same direction when incident light rays are parallel.

FIG. 6 shows the optical path of light rays emitted from a non-spherical light-diffusing particle which allows parallel light rays incident thereon to be emitted from plural points of the particle all in the same direction. When parallel light enters a spherical light-diffusing particle, it is emitted toward the viewer from only one point on the particle. When, on the other hand, parallel light is incident on a non-spherical particle as shown in FIG. 6, light rays are emitted from plural points on the particle toward the viewer. Thus, by looking at the screen from the front, light rays are diffused at a greater angle so that at least two points or more appear to be bright, and scintillation can be alleviated.

According to a preferred embodiment, the non-spherical light-diffusing fine particles may be glass or crosslinked resins such as PMMA and styrene.

BRIEF DESCRIPTION OF THE DRAWINGS

The present invention will be understood more clearly from the description of preferred embodiments taken in conjunction with the accompanying drawings. It should be noted, however, that the embodiments and the drawings are given for explanatory and illustrative purposes only and are not intended to limit the scope of the invention. The scope of the invention is defined by the appended claims. In the drawings, the same reference numbers appearing in plural figures denote the same component parts.

FIG. 1 shows the constructions of preferred embodiments of a screen of a rear-projection image display device of FIG. 7.

FIG. 2 shows the construction of the screen of the rear-projection image display device according to a Comparative Example.

FIG. 3 shows the path of light rays incident on the light-diffusing fine particle.

FIG. 4 shows the light rays emerging from a light-diffusing fine particles.

DETAILED DESCRIPTION OF THE INVENTION

Figure 5A:
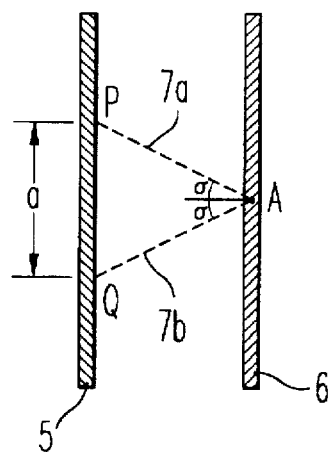
FIG. 5 shows the paths of light rays between the diffusion elements.
Figure 5B:
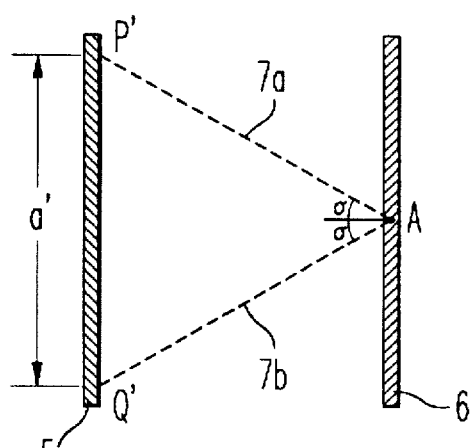
Figure 6:
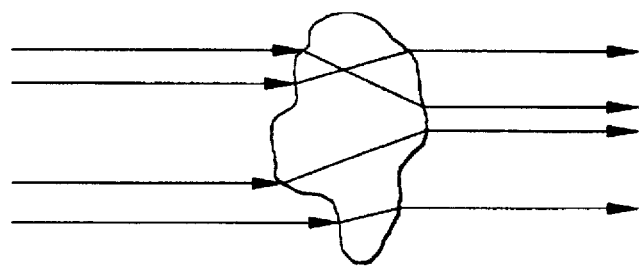
FIG. 6 shows the path of light rays emerging from a non-spherical light-diffusing fine particle.
Figure 7:
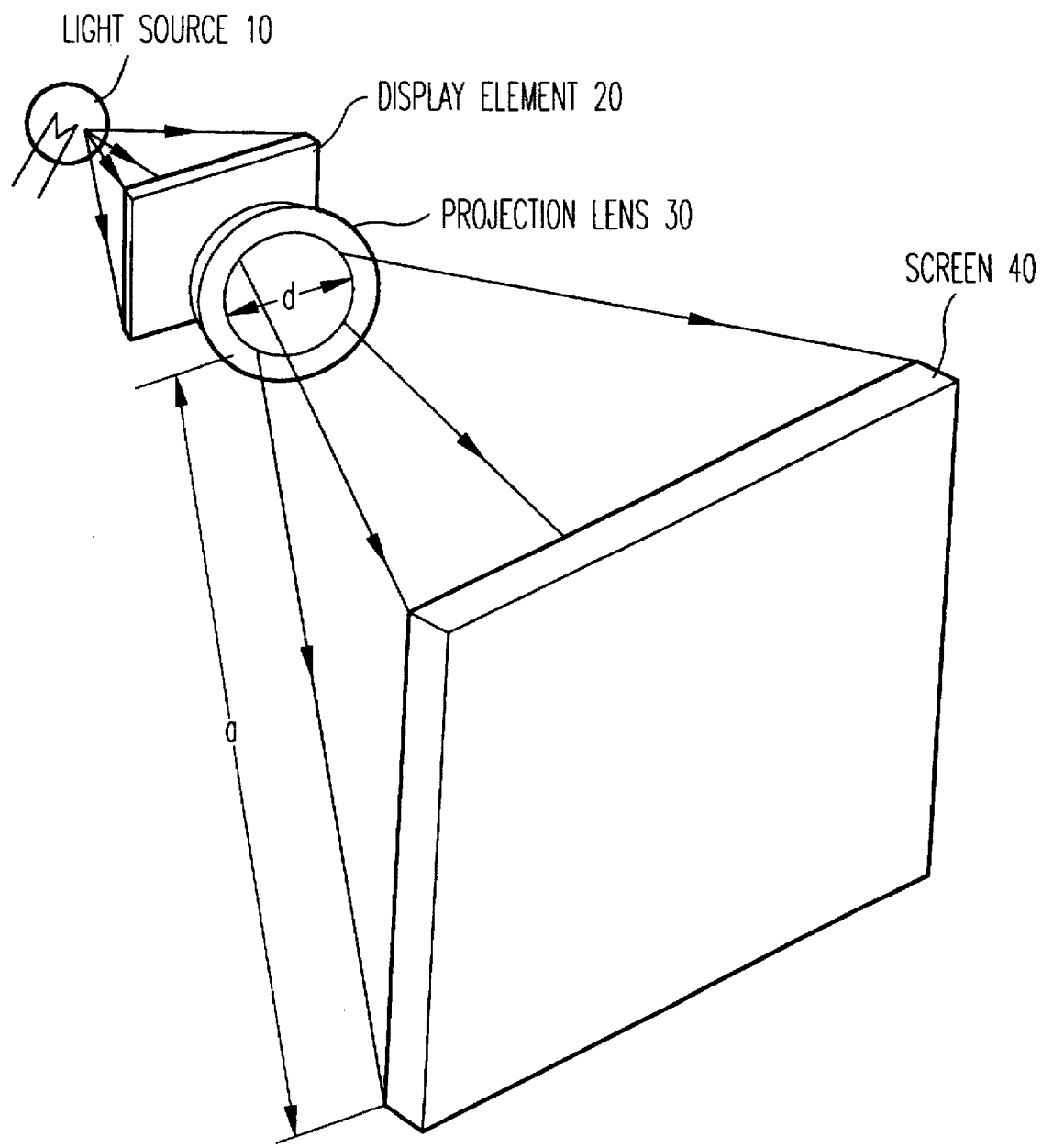
FIG. 7 is a schematic perspective view of a rear-projection display device according to the present invention.

Referring now to the drawings, wherein like reference numerals refer to identical or corresponding parts throughout the several views, and more particularly to FIG. 7 thereof, FIG. 7 illustrates the rear-projection display device according to the present invention as including a light source 10, a display element 20 for visual images, a projection lens 30 and a screen 40 for viewing visual images projected on the screen 40 from the rear of the screen 40. In FIG. 7, (d) represents a diameter of an exit pupil of the projection lens and (a) represents a projection distance.

In the present invention rear-projection image display device, the screen on which projected images are displayed usually comprises a Fresnel lens which directs divergent light rays toward the viewer, and a lenticular lens sheet which diffuses the light rays forming images. At least two diffusion elements are to be provided on the screen, and they may be included in the lenticular lens sheet alone, or in the Fresnel lens and the lenticular lens sheet respectively. The lenticular lens and the Fresnel lens may have a single layer or a plural layer structure. They may be in any form such as one-sheet or three-sheet type so long as there are provided at least two layers acting as the diffusion element on the screen as a whole. Each of the diffusion elements may be a lens such as lenticular lens. Diffusion properties of the diffusion elements may be arbitrarily selected to meet the performance requirements of the image display device as a whole. The distance between the light incident plane of the element arranged closest to the projection lens and the light emergent plane on the emergent side of the element closest to the viewer is preferably 1.5 mm or more. The mean particle size of the light-diffusing particles dispersed in the diffusion element closest to the projection lens is preferably between 5 μm to 15 μm, more preferably between 6 μm to 11 μm.

A rear-projection image display device with a liquid crystal panel as the display element has an exit pupil of the projection lens measuring 28.5 mm in diameter d and 735 mm in projection distance a (d/a is 0.0388) was evaluated for scintillation by varying the screen construction as shown in FIG. 1 and Table 1. Gain of the screen as a whole was set at 6.2. The thickness of the Fresnel lens and of the diffusion layer (diffusion element), haze, and gain of the diffusion sheet (lenticular lens, flat diffusion plate, etc.) of respective embodiments are shown in Table 1.

The screen of the image display device according to Embodiments 1 through 4 comprises two discrete members of a Fresnel lens 1 and a lenticular lens 2, each provided with a diffusion layer (diffusion element) containing light-diffusing fine particles. In Embodiment 1, the Fresnel lens 1 containing light diffusing fine particles, and the Fresnel lens 1 as a whole functions as the diffusion element. The lenticular lens 2 has a two-layer structure with the layer closer to the viewer containing the light diffusing fine particles and the said layer functions as the diffusion element (FIG. 1A). In Embodiment 2, both the Fresnel lens 1 and the lenticular lens 2 have a two-layer structure. The layer of the Fresnel lens 1 arranged closer to the light source contains the light diffusing fine particles and this layer functions as the diffusion element. The layer of the lenticular lens 2 which is closer to the viewer contains the light diffusing fine particles and this layer functions as the diffusion element (FIG. 1B). In Embodiment 3, the Fresnel lens 1 and the lenticular lens 2 contains the light diffusing fine particles, and both of the lenses 1 and 2 as a whole function as the diffusion element (FIG. 1C). In Embodiment 4, the Fresnel lens 1 has a two-layer structure, and the layer closer to the light source contains the light diffusing fine particles, the said layer functioning as the diffusion element. The lenticular lens 2 of Embodiment 4 contains the light diffusing fine particles and the lenticular lens 2 as a whole functions as the diffusion element (FIG. 1D).

The screen of the image display device according to Embodiments 5 through 9 comprises two discrete members of a Fresnel lens 1 and a flat diffusion plate 3. In Embodiment 5, the Fresnel lens 1 contains the light diffusing fine particles and the Fresnel lens 1 as a whole functions as the diffusion element. The flat diffusion plate 3 has a two-layer structure and the layer closer to the viewer contains the light diffusing fine particles and the said layer functions as the diffusion element (FIG. 1E). In Embodiment 6, both the Fresnel 1 and the flat diffusion plate 3 respectively have a two-layer structure. The layer of the Fresnel lens 1 closer to the light source contains the light diffusing fine particles, the said layer closer to the light source functioning as the diffusion element. The layer of the flat diffusion plate 3 closer to the viewer contains the light diffusing fine particles, and the said layer closer to the viewer functioning as the diffusion element (FIG. 1F). In Embodiment 7, the Fresnel lens 1 contains the light diffusing fine particles, and the Fresnel lens 1 as a whole functions as the diffusion element. The flat diffusion plate 3 has a three-layer structure, and the layer closer to the viewer and the one closer to the light source respectively contains the light diffusing fine particles, the said layer closer to the viewer and the layer closer to the light source functioning as the diffusion element (FIG. 1G).

In Embodiment 8, both the Fresnel lens 1 and the flat diffusion plate 3 have a two-layer structure. The layer of the Fresnel lens 1 closer to the light source contains the light diffusing fine particles and the said layer closer to the light source functions as the diffusion element. The layer of the flat diffusion plate 3 closer to the viewer contains the light diffusing fine particles, and the said layer closer to the viewer functions as the diffusion element (FIG. 1H). In Embodiment 9, the Fresnel lens 1 does not contain the light diffusing fine particles. The flat diffusion plate 3 has a three-layer structure, and the layer closer to the viewer and the layer closer to the light source contains the light diffusing fine particles, the said layer closer to the viewer and the layer closer to the light source functioning respectively as the flat diffusion plate (FIG. 1I).

The screen of the image display device of Embodiments 10 and 11 comprises a single member with a Fresnel lens 1 on the incident side and a lenticular lens 2 on the emergent side. In Embodiment 10, the screen has a three-layer structure, and the Fresnel lens 1 which is closer to the light source and the lenticular lens 2 closer to the viewer respectively contains the light diffusing fine particles, and both the Fresnel and the lenticular lenses 1 and 2 respectively function as the diffusion elements (FIG. 1J). In Embodiment 11, the screen has a two-layer structure, and the Fresnel lens 1 closer to the light source and the lencticular lens 2 closer to the viewer respectively contains the light diffusing fine particles, and both the Fresnel and the lenticular lenses 1 and 2 respectively function as the diffusion elements (FIG. 1K).

The screen of the image display device of Embodiment 12 comprises three discrete members of a Fresnel lens 1, a lenticular lens 2, and a diffusion sheet 4 interposed therebetween. The Fresnel lens 1 does not contain the light diffusing fine particles. The lencticular lens 2 has a two-layer structure, the layer closer to the viewer containing the light diffusing fine particles and the said layer closer to the viewer functioning as the diffusion element. The diffusion sheet 4 is interposed between the Fresnel lens 1 and the lenticular lens 2 and functions as the diffusion element (FIG. 1L).

The screen of the image display device of Embodiment 13 comprises two discrete members of a Fresnel lens 1 and a vertical diffusion lenticular lens which is disposed on the incident side of the former lens and functions as the diffusion element. The Fresnel lens has a two-layer structure with the vertical diffusion lenticular lens arranged closer to the viewer functioning as the diffusion element. The lenticular lens 2, on the other hand, has a two-layer structure, and the layer closer to the viewer contains the light diffusing fine particles, the said layer closer to the viewer functioning as the diffusion element (FIG. 1M).

Comparative Example shown in Table 1 comprises two discrete members of a Fresnel lens and a lenticular lens, with the diffusion layer being provided only on the emergent side of the lenticular lens (FIG. 2).

Constructions of each of the Embodiments and Comparative Example are shown in FIGS. 1 and 2 respectively (areas indicated by oblique lines are the diffusion element). Reference symbols representing different constructions shown in FIG. 1 are given in Table 1.

TABLE 1

| | Fresnel lens sheet | | | | Diffusion sheet | | | | | | | |
|---|---|---|---|---|---|---|---|---|---|---|---|---|
| | Sheet thickness | Diffusion layer thickness | Haze | Others | With/without lens | Sheet thickness | No. of diffusion layer | Diffusion layer thickness | Diffusion layer thickness | Gain | FIG. | Evaluation |
| Embodiment 1 | 3 mm | 3 mm | 18% | — | with | 0.9 mm | 1 | 0.2 mm | — | 7 | FIG. 1A | ○ |
| Embodiment 2 | ↑ | 0.5 mm | ↑ | — | ↑ | ↑ | 1 | ↑ | — | ↑ | FIG. 1B | ○ |
| Embodiment 3 | ↑ | 3 mm | ↑ | — | ↑ | ↑ | 1 | 0.9 mm | — | ↑ | FIG. 1C | ○ |
| Embodiment 4 | ↑ | 0.5 mm | ↑ | — | ↑ | ↑ | 1 | ↑ | — | ↑ | FIG. 1D | ○ |
| Embodiment 5 | ↑ | 3 mm | ↑ | — | without | 2 mm | 1 | 0.2 mm | — | ↑ | FIG. 1E | ○ |
| Embodiment 6 | ↑ | 0.5 mm | ↑ | — | ↑ | ↑ | 1 | ↑ | — | ↑ | FIG. 1F | ○ |
| Embodiment 7 | ↑ | 3 mm | ↑ | — | ↑ | ↑ | 2 | 0.1 mm | 0.1 mm | ↑ | FIG. 1G | ○ |
| Embodiment 8 | ↑ | 0.5 mm | ↑ | — | ↑ | ↑ | 2 | ↑ | ↑ | ↑ | FIG. 1H | ○ |
| Embodiment 9 | ↑ | 0 mm | — | — | ↑ | ↑ | 2 | ↑ | 0.2 mm | 6.2 | FIG. 1I | ○ |
| Embodiment 10 | — | — | — | — | with | 3 mm | 2 | ↑ | ↑ | ↑ | FIG. 1J | ○ |
| Embodiment 11 | — | — | — | — | ↑ | ↑ | 2 | 2.8 mm | ↑ | ↑ | FIG. 1K | ○ |
| Embodiment 12 | 3 mm | 0 mm | — | Diffusion film haze 18% | ↑ | 0.9 mm | 1 | 0.2 mm | — | 7 | FIG. 1L | ○ |
| Embodiment 13 | ↑ | 0 mm | — | Vertical diffusion lens on incident surface | ↑ | ↑ | 1 | ↑ | — | ↑ | FIG. 1M | ○ |
| Comparative embodiment | 3 mm | 0 mm | — | — | with | 0.9 mm | 1 | 0.2 mm | — | 6.2 | FIG. 2 | X |

In the above Table 1, O represents Good and X represents unacceptable.

Evaluation of scintillation was also conducted using a screen having the same construction as the Comparative Embodiment except that non-spherical glass particles having the mean particle size of 10 µm (obtained by crushing glass beads) were dispersed in the lenticular lens. The result obtained was comparable to that for Embodiments 1 through 13.

What is claimed is:

1. A rear-projection image display device, comprising:

a light source;

a display element for visual images;

a projection lens; and a screen for viewing visual images projected on the screen from a rear of the screen;

wherein a ratio d/a between a diameter (d) of an exit pupil of the projection lens and a projection distance (a) is 0.06 or less, said screen whereon visual images are projected includes a first diffusion element arranged closer to the light source and a second diffusion element arranged closer to the viewer, and said second diffusion element containing light-diffusing particles.

2. The rear-projection image display device as claimed in claim 1, wherein a distance between a light incident plane of the diffusion element arranged closer to the light source and a light emergent plane of the diffusion element closer to the viewer is 1.5 mm or more.

3. The rear-projection image display device as claimed in claim 1, further comprising:

said screen comprising two discrete members of a Fresnel lens disposed closer to the light source and a lenticular lens disposed closer to the viewer; and a diffusion element containing light diffusing particles being provided in each of the Fresnel lens and the lenticular lens.

4. The rear-projection image display device as claimed in claim 1, further comprising:

said screen comprising a Fresnel lens disposed closer to the light source;

a flat diffusion plate disposed closer to the viewer; and a diffusion element containing light diffusing particles being provided in each of the Fresnel lens and the flat diffusion plate.

5. The rear-projection image display device as claimed in claim 1, further comprising:

said screen comprising a single member with a Fresnel lens closer to the light source and a lenticular lens closer to the viewer; and a diffusion element containing light diffusing particles being provided in each of the Fresnel lens and the lenticular lens.

6. A rear-projection image display device, comprising:

a light source;

a display element for visual images;

a projection lens; and a screen for viewing visual images projected on the screen from the rear;

wherein a ratio d/a between a diameter (d) of an exit pupil of the projection lens and a projection distance (a) is 0.06 or less, light-diffusing particles are dispersed in said screen for viewing visual images, and said light-diffusing particles are shaped non-spherical so that, when incident light rays are parallel, emergent light rays emitted from plural points on said light-diffusing particles can be directed in an equivalent direction.

* * * * *